United States Patent
Zheng et al.

(10) Patent No.: US 12,511,713 B2
(45) Date of Patent: Dec. 30, 2025

(54) IMAGE SUPER-RESOLUTION RECONSTRUCTING

(71) Applicant: Microsoft Technology Licensing, LLC, Redmond, WA (US)

(72) Inventors: Shuxin Zheng, Redmond, WA (US); Chang Liu, Redmond, WA (US); Di He, Redmond, WA (US); Guolin Ke, Redmond, WA (US); Jiang Bian, Redmond, WA (US); Tie-Yan Liu, Bejing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 393 days.

(21) Appl. No.: 17/927,863

(22) PCT Filed: May 10, 2021

(86) PCT No.: PCT/US2021/031467
§ 371 (c)(1),
(2) Date: Nov. 25, 2022

(87) PCT Pub. No.: WO2022/005611
PCT Pub. Date: Jan. 6, 2022

(65) Prior Publication Data
US 2023/0206396 A1    Jun. 29, 2023

(30) Foreign Application Priority Data
Jun. 30, 2020  (CN) .................. 202010621955.4

(51) Int. Cl.
*G06T 3/4053* (2024.01)
*G06T 3/4046* (2024.01)

(52) U.S. Cl.
CPC .......... *G06T 3/4053* (2013.01); *G06T 3/4046* (2013.01)

(58) Field of Classification Search
CPC ........................... G06T 3/4053; G06T 3/4046
See application file for complete search history.

(56) References Cited

U.S. PATENT DOCUMENTS 8,594,464 B2  11/2013  Liu
9,692,939 B2   6/2017  Irani et al.
(Continued)

FOREIGN PATENT DOCUMENTS

| CN | 110136063 A | 8/2019 |
| CN | 110310227 A | 10/2019 |
| WO | 2019102476 A2 | 5/2019 |

OTHER PUBLICATIONS

Xiao, Mingging, Shuxin Zheng, Chang Liu, Yaolong Wang, Di He, Guolin Ke, Jiang Bian, Zhouchen Lin, and Tie-Yan Liu. 'Invertible Image Rescaling'. arXiv [Eess.IV], 2020. arXiv. htto://arxiv.org/abs/2005.05650 (Year: 2020).*
(Continued)

*Primary Examiner* — Matthew C Bella
*Assistant Examiner* — Jinsu Hwang
(74) *Attorney, Agent, or Firm* — Schwegman Lundberg & Woessner, P.A.

(57) ABSTRACT

According to implementations of the subject matter described herein, a solution is proposed for super-resolution image reconstructing. According to the solution, an input image with first resolution is obtained. An invertible neural network is trained using the input image, wherein the invertible neural network is configured to generate an intermediate image with second resolution and first high-frequency information based on the input image, the second resolution being lower than the first resolution. Subsequently, an output image with third resolution is generated based on the input image and second high-frequency information by using an inverse network of the trained invertible neural network, the second high-frequency information con- (Continued)

forming to a predetermined distribution, and the third resolution being higher than the first resolution. The solution can effectively process a low-resolution image obtained by an unknown downsampling method, thereby obtaining a high-quality and high-resolution image.

16 Claims, 6 Drawing Sheets

(56) References Cited

U.S. PATENT DOCUMENTS

| | | | |
|---|---|---|---|
| 10,489,887 B2* | 11/2019 | El-Khamy | G06N 3/045 |
| 2013/0016920 A1 | 1/2013 | Matsuda et al. | |
| 2018/0075581 A1 | 3/2018 | Shi et al. | |

OTHER PUBLICATIONS

Bell-Kligler, et al., "Blind Super-Resolution Kernel Estimation using an Internal-GAN", In Journal of Computing Research Repository, Sep. 2019, pp. 1-10.

He, et al., "A soft MAP framework for blind super-resolution image reconstruction", In Journal of Image and Vision Computing, vol. 27, Issue 4, Mar. 1, 2009, 10 Pages.

Li, et al., "Multi-Scale Invertible Network for Image Super-Resolution", In Proceedings of the ACM Multimedia Asia, Dec. 15, 2019, 6 Pages.

Michaeli, et al., "Nonparametric blind super-resolution", In Proceedings of the IEEE International Conference on Computer Vision, Dec. 1, 2013, pp. 945-952.

"International Search Report and Written Opinion issued in PCT Application No. PCT/US21/031467", Mailed Date: Aug. 20, 2021, 9 Pages.

Qin, et al., "Blind Single-Image Super Resolution Reconstruction with Gaussian Blur and Pepper & Salt Noise", In Journal of Computers, vol. 9, Issue 4, Apr. 2014, pp. 896-902.

Xiao, et al., "Invertible Image Rescaling", In Repository of arXiv:2005.05650v1, May 12, 2020, 27 Pages.

First Office Action Received for Chinese Application No. 202010621955.4, mailed on Feb. 26, 2025, 18 pages. (English Translation Provided).

Rejection Decision Received for Chinese Application No. 202010621955.4, mailed on Jul. 25, 2025, 18 pages (English Translation Provided).

Communication pursuant to Article 94(3) received in European Application No. 21730006.0, mailed on Sep. 3, 2025, 4 Pages.

* cited by examiner

IMAGE SUPER-RESOLUTION RECONSTRUCTING

CROSS-REFERENCE TO RELATED APPLICATION

This application is a U.S. National Stage Filing under 35 U.S.C. 371 of International Patent Application Serial No. PCT/US2021/031467, filed May 10, 2021, and published as WO 2022/005611 A1 on Jan. 6, 2022, which application claims the benefit of priority to Chinese Patent Application No. 202010621955.4, filed Jun. 30, 2020, which applications and publication are incorporated herein by reference in their entirety.

BACKGROUND

Image Super-resolution (SR) reconstructing refers to a process of generating a high-resolution image based on a low-resolution image. By increasing the resolution of an image, super-resolution technology can improve the quality of the image and thus can provide an image with a clearer appearance, or enable the image to be better utilized for subsequent image processing tasks, such as image analysis. Super-resolution technology has been used in many aspects of people's lives.

With the development of computer technology, machine learning-based methods have been proposed in recent years in addition to traditional interpolation-based methods and reconstructing-based methods. However, traditional machine learning methods rely on pairs of high-resolution and low-resolution images. Since such image pairs cannot be obtained in reality in most cases, some traditional solutions utilize known downsampling methods for generating low-resolution images so as to generate image pairs for training machine learning models. However, the machine learning model trained with such image pairs can only achieve good performances when processing low-resolution images obtained through the same downsampling method, but it is difficult to effectively process low-resolution images obtained through other downsampling methods.

SUMMARY

According to implementations of the subject matter described herein, a solution is provided for super-resolution image reconstructing. According to the solution, an input image of a first resolution is obtained. An invertible neural network is trained with the input image, wherein the invertible neural network is configured to generate an intermediate image of a second resolution and first high-frequency information based on the input image, the second resolution being lower than the first resolution. Subsequently, an output image with a third resolution is generated based on the input image and second high-frequency information by using an inverse network of the trained invertible neural network, the second high-frequency information conforming to a predetermined distribution, and the third resolution being greater than the first resolution. The solution can effectively process a low-resolution image obtained through an unknown downsampling method, thereby obtaining a high-quality and high-resolution image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference signs refer to the same or similar elements.

DETAILED DESCRIPTION

Figure 1A:
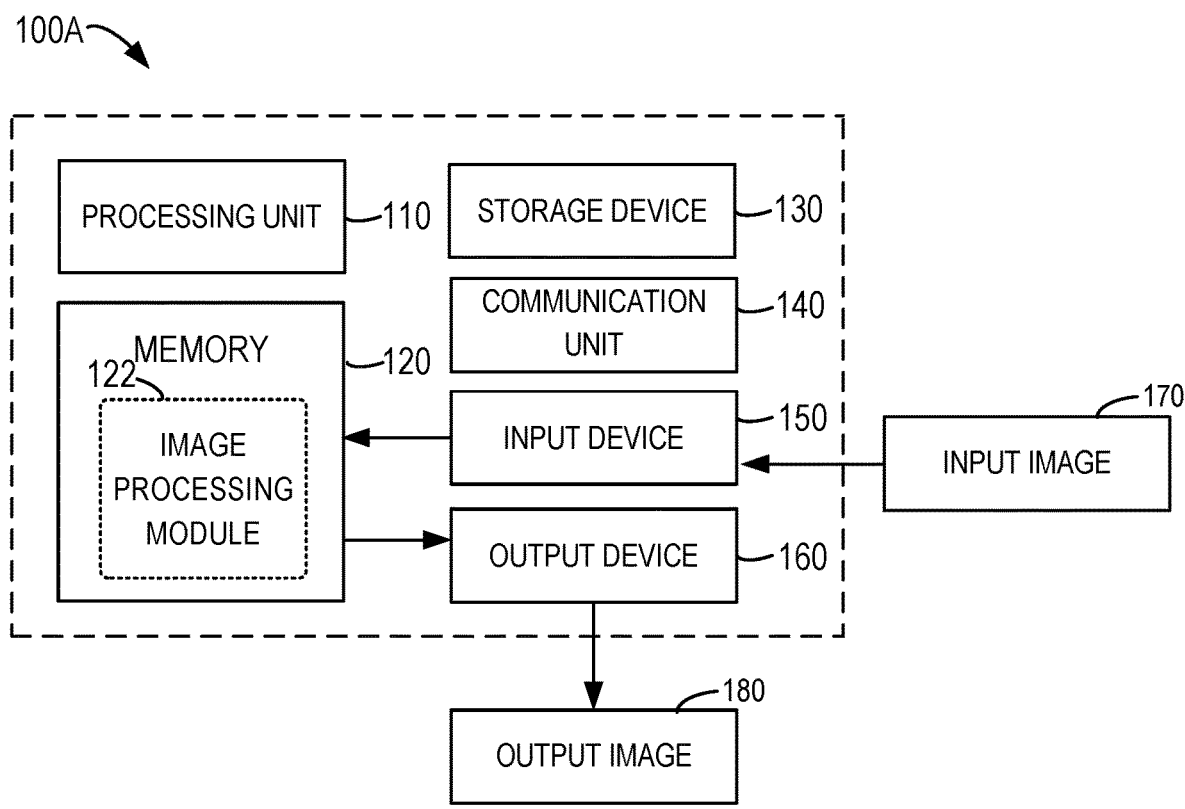
FIG. 1A illustrates a schematic block diagram of a computing device which can implement a plurality of implementations of the subject matter described herein.

The subject matter described herein will now be discussed with reference to several example implementations. It is to be understood these implementations are discussed only for the purpose of enabling persons skilled in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or the same objects. Other definitions, explicit and implicit, may be included below.

As used herein, the term "neural network" can handle inputs and provide corresponding outputs and it typically includes an input layer, an output layer and one or more hidden layers between the input and output layers. Individual layers of the neural network model are connected in sequence, such that an output of a preceding layer is provided as an input for a following layer, where the input layer receives the input of the neural network while the output of the output layer acts as the final output of the neural network. Each layer of the neural network includes one or more nodes (also referred to as processing nodes or neurons) and each node processes the input from the preceding layer. In the text, the terms "neural network," "model," "network" and "neural network model" may be used interchangeably.

As discussed above, super-resolution methods have been widely used in many aspects of people's lives. Technically, traditional super-resolution methods can be divided into three categories: (1) interpolation-based methods, (2) reconstructing-based methods, and (3) learning-based methods.

With the rapid development of artificial intelligence technology, the learning-based method has become the most popular super-resolution algorithm. The method calculates prior knowledge of a high-resolution image and a low-resolution image with the help of a training sample pair (a high-resolution image and a corresponding low-resolution image) and builds a mapping model between them.

The traditional learning-based super-resolution method usually relies on pairs of high-resolution images and low-resolution images. Such high/low resolution image pairs actually do not exist in real scenarios. Therefore, some traditional super-resolution algorithms build high/low resolution image pairs by artificially synthesizing corresponding high-resolution images or low-resolutions images. Such image pairs are further applied to a machine learning model, so that the machine learning model can generate a high-resolution image with a low-resolution image.

However, the machine learning model trained with such image pairs can only achieve good performances when processing a low-resolution image obtained through the same downsampling method. For example, if a sample pair for training the model is low-resolution images obtained through an interpolation method, then the model can only achieve a good-quality high-resolution image when processing a low-resolution image which is also obtained through interpolation.

In most cases, people often are unaware about how a low-resolution image to be processed is generated. Under these circumstances, super-resolution is also called blind super-resolution. Since a downsampling method used by an artificially built image pair is different from a downsampling method for the low-resolution image which needs to be processed in most cases, it may be difficult for a trained machine learning model to achieve high-quality image super-resolution.

According to implementations of the subject matter described herein, a solution is proposed for super-resolution image reconstructing. In the solution, an invertible neural network is trained with an input image of a first resolution, wherein the invertible neural network is configured to generate an intermediate image of a second resolution and first high-frequency information based on the input image, and the second resolution is higher than the first resolution. Subsequently, an output image with a third resolution is generated based on the input image and second high-frequency information by using an inverse network of the trained reversible neural network, the second high-frequency information conforming to a predetermined distribution, wherein the third resolution is greater than the first resolution. Specifically, when training an invertible neural network, a low-resolution input image will be converted to a lower-resolution image, so that a forward process of the invertible neural network can simulate an unknown downsampling method used for the input image. Subsequently, the low-resolution input image may be processed using an inverse network of the invertible neural network, so that a high-resolution output image may be obtained.

Detailed description is presented below to various example implementations of the solution in conjunction with the drawings.

FIG. 1A illustrates a block diagram of a computing device 100 that can implement a plurality of implementations of the subject matter described herein. It should be understood that the computing device 100 shown in FIG. 1 is only exemplary and shall not constitute any limitation on the functions and scopes of the implementations described by the subject matter described herein. As shown in FIG. 1, the computing device 100 includes a computing device 100 in the form of a general purpose computing device. Components of the computing device 100 may include, but are not limited to, one or more processors or processing units 110, a memory 120, a storage device 130, one or more communication units 140, one or more input devices 150, and one or more output devices 160.

In some implementations, the computing device 100 may be implemented as various user terminals or service terminals with computing capability. The service terminals may be servers, large-scale computing devices, and the like provided by a variety of service providers. The user terminal, for example, is a mobile terminal, a fixed terminal or a portable terminal of any type, including a mobile phone, a site, a unit, a device, a multimedia computer, a multimedia tablet, Internet nodes, a communicator, a desktop computer, a laptop computer, a notebook computer, a netbook computer, a tablet computer, a Personal Communication System (PCS) device, a personal navigation device, a Personal Digital Assistant (PDA), an audio/video player, a digital camera/video, a positioning device, a television receiver, a radio broadcast receiver, an electronic book device, a gaming device or any other combination thereof consisting of accessories and peripherals of these devices or any other combination thereof. It may also be predicted that the computing device 100 can support any type of user-specific interface (such as a "wearable" circuit, and the like).

The processing unit 110 may be a physical or virtual processor and may execute various processing based on the programs stored in the memory 120. In a multi-processor system, a plurality of processing units executes computer-executable instructions in parallel to enhance parallel processing capability of the computing device 100. The processing unit 110 can also be referred to as a central processing unit (CPU), microprocessor, controller and microcontroller.

The computing device 100 usually includes a plurality of computer storage mediums. Such mediums may be any attainable medium accessible by the computing device 100, including but not limited to, a volatile and non-volatile medium, a removable and non-removable medium. The memory 120 may be a volatile memory (e.g., a register, a cache, a Random Access Memory (RAM)), a non-volatile memory (such as, a Read-Only Memory (ROM), an Electrically Erasable Programmable Read-Only Memory (EEPROM), flash), or any combination thereof.

The storage device 130 may be a removable or non-removable medium, and may include a machine-readable medium (e.g., a memory, a flash drive or a magnetic disk) or any other medium, which may be used for storing information and/or data and be accessed within the computing device 100. The computing device 100 may further include removable/non-removable, volatile/non-volatile storage media. Though not shown in FIG. 1, a magnetic disk drive for reading from or writing to a removable and non-volatile magnetic disk and an optical disk drive for reading from or writing to a removable and non-volatile optical disk may be provided. In these cases, each drive may be connected to a bus (not shown) via one or more data media interfaces.

The communication unit 140 effects communication with a further computing device through a communication medium. Additionally, functions of components of the computing device 100 may be realized by a single computing cluster or a plurality of computing machines and these computing machines may communicate through communication connections. Therefore, the computing device 100 may operate in a networked environment using a logic connection to one or more other servers, a Personal Computer (PC) or a further general network node.

The input device 150 may be one or more various input devices, such as a mouse, a keyboard, a trackball, a voice-input device, and the like. The output device 160 may be one or more output devices, e.g., a display, a loudspeaker, a printer, and so on. The computing device 100 may also communicate through the communication unit 140 with one or more external devices (not shown) as required, where the external device, e.g., a storage device, a display device and so on, communicates with one or more devices that enable users to interact with the computing device 100, or with any device (such as a network card, a modem, and the like) that enable the computing device 100 to communicate with one or more other computing devices. Such communication may be executed via an Input/Output (I/O) interface (not shown).

In some implementations, besides being integrated on a single device, some or all components of the computing device 100 may further be provided in the form of cloud computing architecture. In the cloud computing architecture, these components may be remotely arranged and work together to realize functions described herein. In some implementations, cloud computing provides computation, software, data access and storage services, which do not require end users to know physical locations or configurations of systems or hardware that provide these services. In various implementations, cloud computing uses appropriate protocols to provide services through a wide-area network (e.g., the Internet). For example, a cloud computing provider provides applications through a wide-area network, and these applications may be accessed through a web browser or any other computing component. Software or components and corresponding data of the cloud computing architecture may be stored on a server at a remote location. Computing resources in a cloud computing environment may be merged or decentralized at a remote data center location. Cloud computing infrastructures may provide services by sharing the data center, even if they are presented as single access points to users. Therefore, cloud computing infrastructures may be used to provide the components and functions described herein from a server provider at a remote location. Alternatively, they may be provided from a conventional server, or they may be installed on a client device directly or in other ways.

The computing device 100 may be used to implement image super-resolution reconstructing according to various implementations of the subject matter described herein. The memory 120 may comprise an image processing module 122 with one or more program instructions, which module may be accessed and run by the processing unit 110 so as to realize functions of various implementations described herein.

During super-resolution image reconstructing, the computing device 100 may receive an input image 170 through the input device 150. In some implementations, the input image 170 may be, for example, an image of a first resolution. The input image 170 may be input to the image processing module 122 in the memory 120. The image processing module 122 may train an invertible neural network with the input image 170, so that a forward network of the invertible neural network can simulate a method by which the input image 170 is downsampled. The invertible neural network can convert the input image 170 to an intermediate image with a lower resolution. Subsequently, an inverse network of the invertible neural network is used to process the input image 170 to obtain an output image with a greater resolution and thereby realize super-resolution image reconstructing. The output image 180 may be output via the output device 160.

Figure 1B:
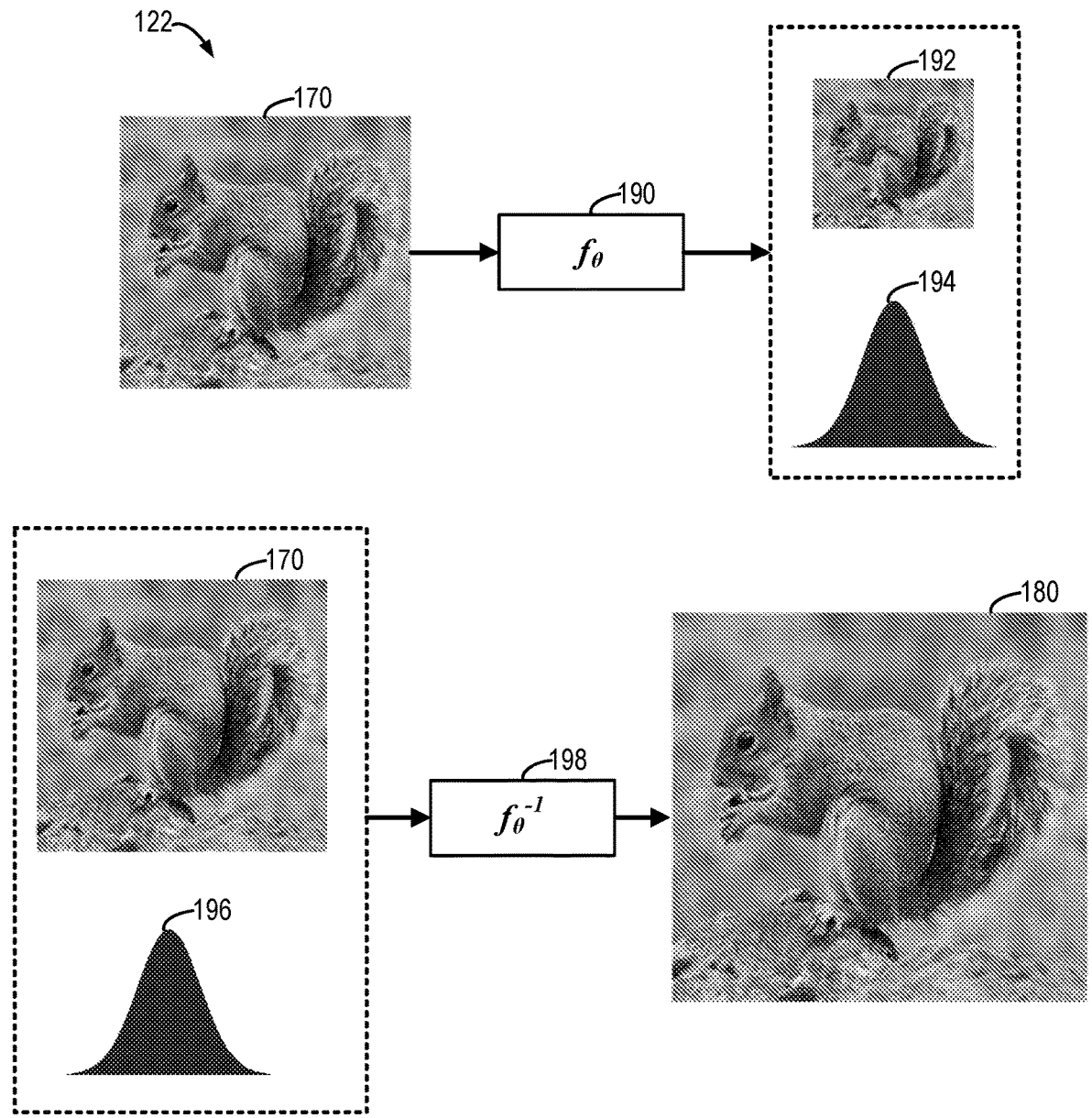
FIG. 1B illustrates a schematic view of working principles of an image processing module according to implementations of the subject matter described herein.

FIG. 1B shows a schematic view of working principles of the image processing module 122 according to implementations of the subject matter described herein. As shown in FIG. 1B, the image processing module 122 may train an invertible neural network 190 (denoted as "$f_\theta$") with the input image 170 of a first resolution. The invertible neural network 190 is configured to generate an intermediate image 192 of a lower second resolution and first high-frequency information 194 based on the input image 170. Further, after completion of training the invertible neural network 180 with the input image 170, the input image 170 and second high-frequency information that conforms to a predetermined distribution are input to an inverse network 198 (denoted as "$f_\theta^{-1}$") of the invertible neural network 190, so as to generate the output image 180 of a greater third resolution. The "predetermined distribution" mentioned here may include, but not limited to, a Gaussian distribution, an even distribution, etc., which may be specified during the training process of the invertible neural network.

The invertible neural network (INN) is a popular network structure among generating models, which may specify a mapping relation $m=f_\theta(n)$ and its inverse mapping relationship $n=f_\theta^{-1}(m)$. INN is usually composed of at least one invertible block. For the $1^{st}$ block, an input $h^l$ is divided into $h_1^l$ and $h_2^l$ along a channel axis and undergoes affine transformation:

$$h_1^{l+1}=h_1^l+\phi(h_2^l) \tag{1}$$

$$h_1^{l+1}=h_2^l\odot \exp(\rho(h_1^{l+1}))+\eta(h_1^{l+1}) \tag{2}$$

A corresponding output is $[h_1^{l+1},h_2^{l+1}]$. For a given output, its inverse transformation may be calculated as below:

$$h_2^l=(h_2^{l+1}-\eta(h_1^{l+1}))\odot \exp(-\rho(h_1^{l+1})) \tag{3}$$

$$h_1^l=h_1^{l+1}-\phi(h_2^l) \tag{4}$$

wherein φ, ρ and η may be any functions, and $\odot$ denotes an XOR operation.

When the INN is applied to an image downsampling task, based on an input image x of a high resolution, the INN may output not only a downscaled image y with a low resolution but also high-frequency information z that conforms to a specific distribution, the high-frequency information z being embodied as, e.g., high-frequency noise that is irrelevant to semantics of the image. As a result, an inverse network of the INN can reconstruct the image x of high quality and a high resolution based on the image y of a low resolution and the high-frequency information z. That is, the high-frequency information z which is lost during the image reducing process needs to be maintained so as to make the image scaling invertible, and the whole image zoom process may be represented using the mapping relations ($\mathcal{Y}$,z)=$f_\theta$(x) and x=$f_\theta^{-1}$($\mathcal{Y}$,z).

However, during the image super-resolution reconstructing, it is usually necessary to upscale images with any resolution. Therefore, the high-frequency information z corresponding to the input low-resolution image does not exist. The inventors have noted that according to the Nyquist Shannon Sampling Theorem, information lost during the image reduction process corresponds to high-frequency details. Suppose a set of high-resolution images corresponding to the same low-resolution image comprises different high-frequency details, these details may usually exhibit certain variability and randomness. Therefore, z may be represented as a random variable, whose distribution depends on a way that the INN represents z (i.e., a way that $f_\theta$ outputs z). Specifically, the INN may be trained to satisfy a specified distribution p(z). In this way, the high-resolution image may be reconstructed based on the low-resolution image and any sample under the specified distribution during the image super-resolution reconstructing.

Figure 2A:
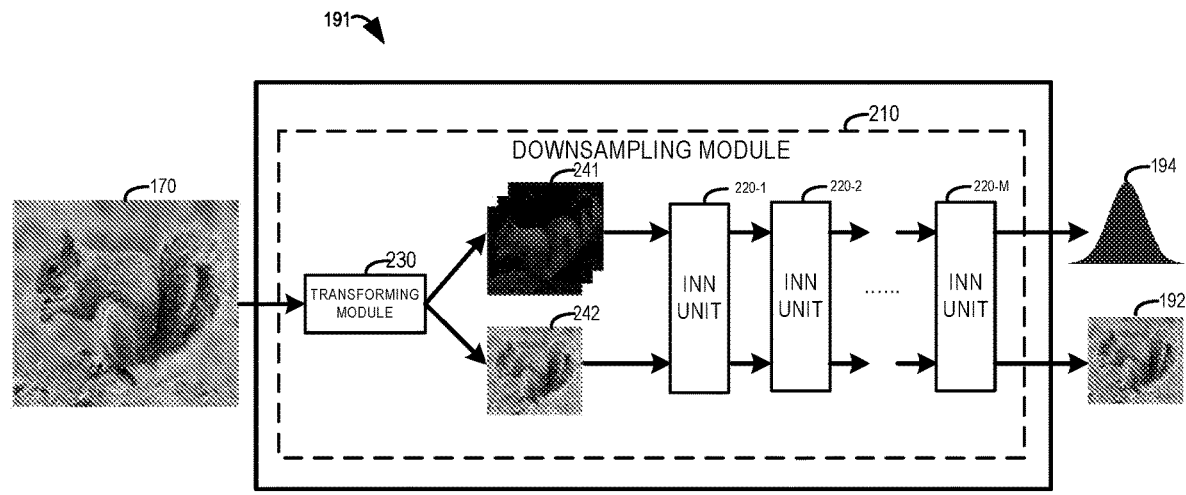
FIG. 2A illustrates a schematic block diagram of an invertible neural network according to implementations of the subject matter described herein.

FIG. 2A shows a schematic block diagram of the invertible neural network 191 according to implementations of the subject matter described herein. It should be understood that the structure of the invertible neural network 191 as shown in FIG. 2A is merely exemplary and not intended to limit the scope of the subject matter described herein. Implementations of the subject matter described herein are also applicable to an invertible neural network with a different structure.

As shown in FIG. 2A, the invertible neural network 191 may be formed by serially connecting one or more downsampling modules 210. For the purpose of brevity, only one downsampling module 210 is shown in FIG. 2A. The image reduction ratio supported by the invertible neural network 191 may be determined by the image reduction ratio supported by each downsampling module 210 and the number of included downsampling modules 210. For example, suppose each downsampling module 210 supports to downscale the image by 2 times and the invertible neural network 191 includes 2 downsampling neural modules 210, then the invertible neural network 191 supports to downscale the image by 4 times.

As shown in FIG. 2A, for example, the downsampling module 210 may comprise a transforming module 230 and one or more INN units 220-1, 220-2 ... 220-M (collectively or separately referred to as "INN unit 220," wherein M≥1).

The transforming module 230 may decompose the input image 170 into a low-frequency component 242 and a high-frequency component 241, wherein the low-frequency component 242 represents semantics of the input image 170 and the high-frequency component 241 is related to the semantics. In some implementations, the transforming module 230 may be implemented using 1×1 invertible convolution blocks. Alternatively, the transforming module 230 may also be implemented as a wavelet transforming module, such as a Haar transforming module. For example, when the transforming module 230 is implemented as a Haar transforming module, the downsampling module 210 may support to reduce the image by 2 times. Specifically, the Haar transforming module may convert an input image with a length H, a width W and the channel number C or a set of feature maps into an output tensor $$\left(\frac{1}{2}H, \frac{1}{2}W, 4C\right).$$

The first C slice in the output tensor may approximate a low-pass representation of bilinear interpolation downsampling. The remaining three sets of C slices comprise residual components in the vertical, horizontal and diagonal directions respectively. These residual components are based on the high-frequency information in the input image 170. Alternatively, the transforming module 230 may be implemented as any known or to-be-developed transforming module that can decompose the input image 170 into a low-frequency component and a high-frequency component.

It should be understood that when the image reduction ratio supported by the downsampling module 210 differs, the implementation of the transforming module 230 may also differ. In this way, the low-frequency 242 and the high-frequency information 241 may be fed to the following INN unit 220-1.

As described above, the structure of each INN unit 220 is supposed to be invertible, so as to guarantee that the network structure of the neural network 191 is invertible. The INN unit 220 is used to extract corresponding features from the input low-frequency component and high-frequency component and convert the high-frequency component related to the image semantics into high-frequency information that is irrelevant to the image semantics and conforms to the predetermined distribution.

Figure 2B:
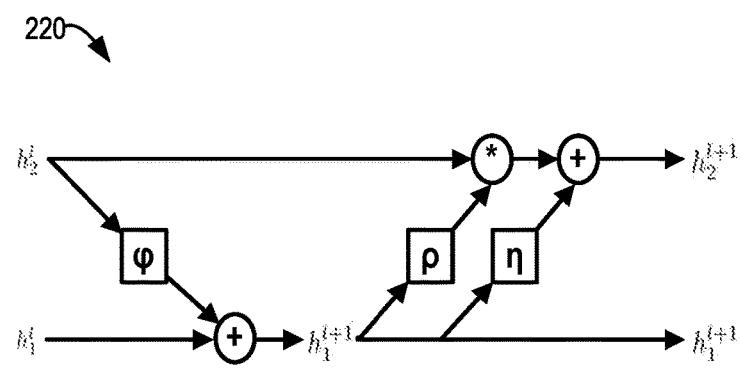
FIG. 2B illustrates a schematic view of an example invertible neural network unit according to implementations of the subject matter described herein.

FIG. 2B shows a schematic view of an example INN unit 220 according to implementations of the subject matter described herein. Suppose the low-frequency component and the high-frequency component input to the INN unit 220 are represented as $h_1^l$ and $h_2^l$, respectively. As shown in FIG. 2B, the affine transformation as shown in Formula (1) may be applied to the low-frequency component $h_1^l$, and the affine transformation as shown in Formula (2) may be applied to the high-frequency component $h_2^l$. Transformation functions $\varphi$, $\eta$ and $\rho$ shown in FIG. 2B may be any functions. It should be understood that the INN unit 220 as shown in FIG. 2B is only for the purpose of illustration and not intended to limit the scope of the subject matter described herein. Implementations of the subject matter described herein are also applicable to an INN unit with other different structures. Examples of the INN unit include, without limitation to, an invertible convolution block, an invertible residual grid cell, an invertible generative network unit, a deep invertible network unit, etc.

A training process of the invertible neural network will be described in detail below. As seen from the foregoing description, a training objective of the model is to determine the mapping relation among the high-resolution image x, the low-resolution image y and the specified distribution p(z).

The inventors have observed that after a high-resolution image is converted to a low-resolution image by an unknown downsampling method, the low-resolution image and an image block with a corresponding size in the high-resolution image will have a similar pixel distribution. Based thereon, if the intermediate image 192 generated by the invertible neural network 190 and a corresponding image block in the input image 170 have a similar pixel distribution, this means that the invertible neural network 190 can simulate well the unknown downsampling method of the input method 170.

Based on this objective, in some implementations, a target function (also referred to as "a first target function") of the invertible neural network 190 may be determined based on a difference between a pixel distribution in the intermediate image 192 and a pixel distribution in an image block of a second resolution in the input image 170.

Figure 3:
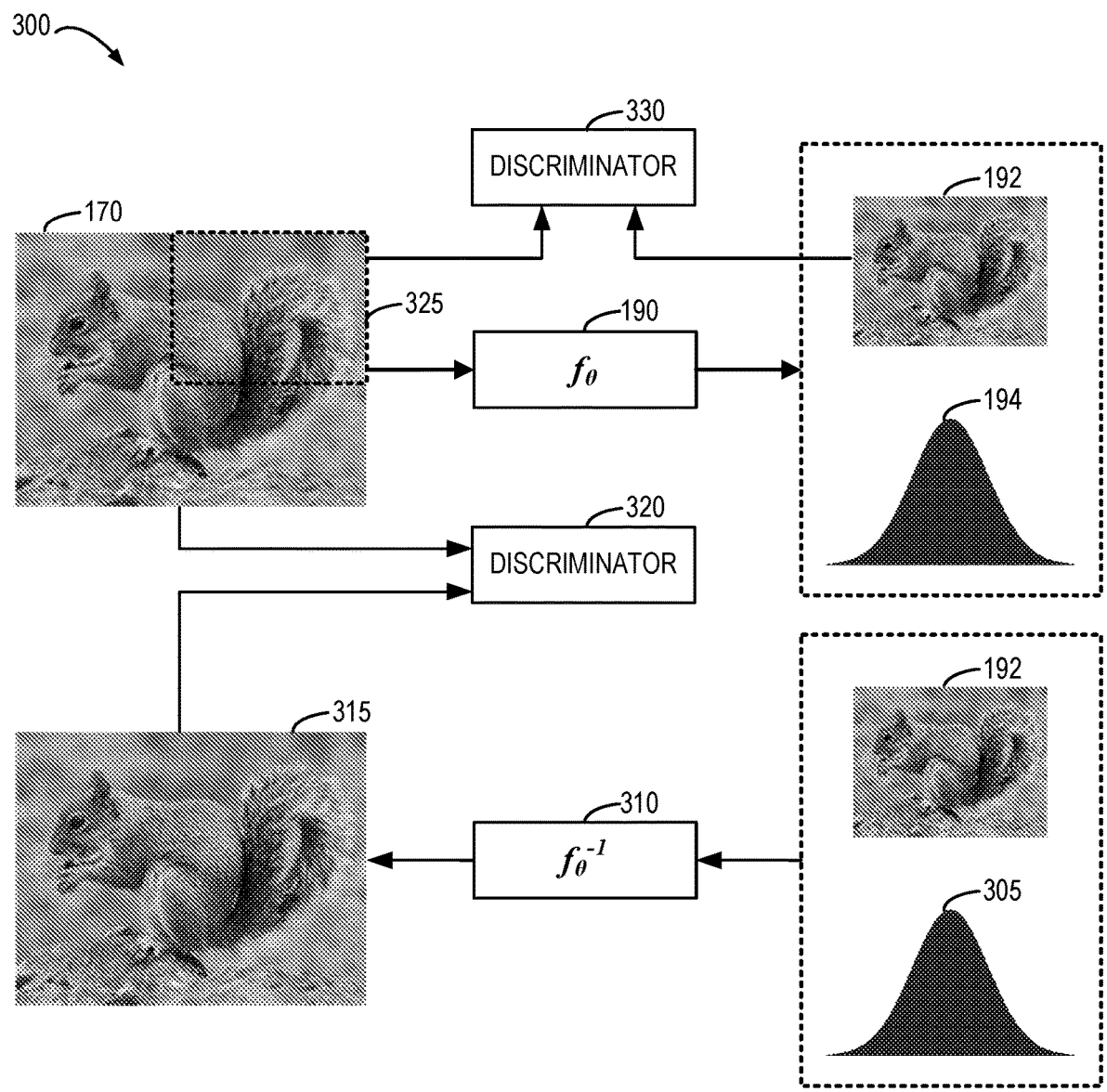
FIG. 3 illustrates a schematic view of training the invertible neural network according to implementations of the subject matter described herein.

In some implementations, a discriminator may be used to determine the difference between pixel distributions in the intermediate image 192 and in the corresponding image block in the input image 170. FIG. 3 shows a schematic view 300 of training the invertible neural network 190 according to implementations of the subject matter described herein.

As shown in FIG. 3, during the training process, a discriminator 330 may be used to distinguish the difference between a pixel distribution in the intermediate image 192 generated by the invertible neural network 190 and a pixel distribution in a corresponding image block 325 in the input image 170. In some implementations, the image block 325 may be an image block which is randomly selected from the input image 170 and has the same pixel size with the intermediate image 192.

In some implementations, whether a pixel in the intermediate image 192 belongs to the intermediate image 192 or the image block 325 may be distinguished based on the discriminator 330 of a trained generative adversarial network (GAN). A loss function of the corresponding GAN may be determined as the first target function of the invertible neural network 190, which may be represented as a target function $L_{pd}$. It should be understood that any appropriate GAN loss function may be used, such as JS divergence.

Additionally or alternatively, in some implementations, when the invertible neural network 190 is trained, the first high-frequency information 194 generated by the invertible neural network 190 based on the input image 170 is supposed to satisfy a predetermined distribution. Specifically, a target function (also referred to as "a second target function") of the invertible neural network 190 may be determined based on a difference between a distribution of the first high-frequency information 194 and the predetermined distribution, e.g., the target function being represented as a target function $L_{dm_i}$. As discussed above, the "predetermined distribution" mentioned here may include, without limitation to, a Gaussian distribution, an even distribution, etc.

Additionally or alternatively, in some implementations, a target function (also referred to as "a third target function") for training the invertible neural network 190 may be determined based on a difference between the input image 170 and a rebuilt image 315 generated by an inverse network 310 of the invertible neural network 190 based on the intermediate image 192. Specifically, the intermediate image 192 and high-frequency information sampled from the predetermined distribution may be input to the inverse network 310 so as to obtain the rebuilt image. Regarding the structure of the inverse network 310, a detailed description will be presented with reference to FIG. 4.

In some implementations, the third target function may be determined based on an L1 distance or L2 distance between the input image 170 and the rebuilt image 315, e.g., which may be represented as a target function $L_{recon}$.

Additionally or alternatively, in some implementations, as shown in FIG. 3, a trained discriminator 320 may also be used to distinguish the input image 170 and the rebuilt image 315 to determine the third target function. As an example, the discriminator 320 may be a discriminator of a trained generative adversarial network (GAN). Accordingly, the third target function may be set as a loss function of GAN, e.g., which may be represented as $L_{dm_x}$.

In some implementations, to accelerate the convergence of the invertible neural network 190 and make semantics of the generated intermediate image 192 accurate, a target function (also referred to as "a fourth target function") for training the invertible neural network 190 may be determined based on a reference image. As an example, a reference image with second resolution and corresponding to the semantics of the input image 170 may be obtained as training data so as to train the model. In some implementations, the reference image may be generated based on the input image 170. For example, a low-resolution reference image corresponding to the semantics of the input image 170 may be generated using an interpolation method or any known or to-be-developed method.

In some implementations, the fourth target function may be determined based on a difference between the reference image and the intermediate image 192 generated by the invertible neural network. In some implementations, the fourth target function may be determined based on the L1 distance and the L2 distance between the intermediate image 192 and the reference image, e.g., which may be represented as a target function $L_{guide}$.

In some implementations, a total target function for training the invertible neural network 190 may be generated based on a combination of the first target function, the second target function and the third target function. For example, the total target function may be represented as:

$$L_{total} = \lambda_1 \cdot L_{pd} + \lambda_2 \cdot L_{dm_z} + \kappa_3 \cdot L_{recon} + \lambda_4 \cdot L_{dm_x} + \lambda_5 \cdot L_{guide} \quad (5)$$

wherein $\lambda_1$, $\lambda_2$, $\lambda_3$, $\lambda_4$ and $\lambda_5$ are coefficients for balancing different loss items. By minimizing the total target function $L_{total}$, parameters of the invertible neural network 190 may be determined.

Figure 4A:
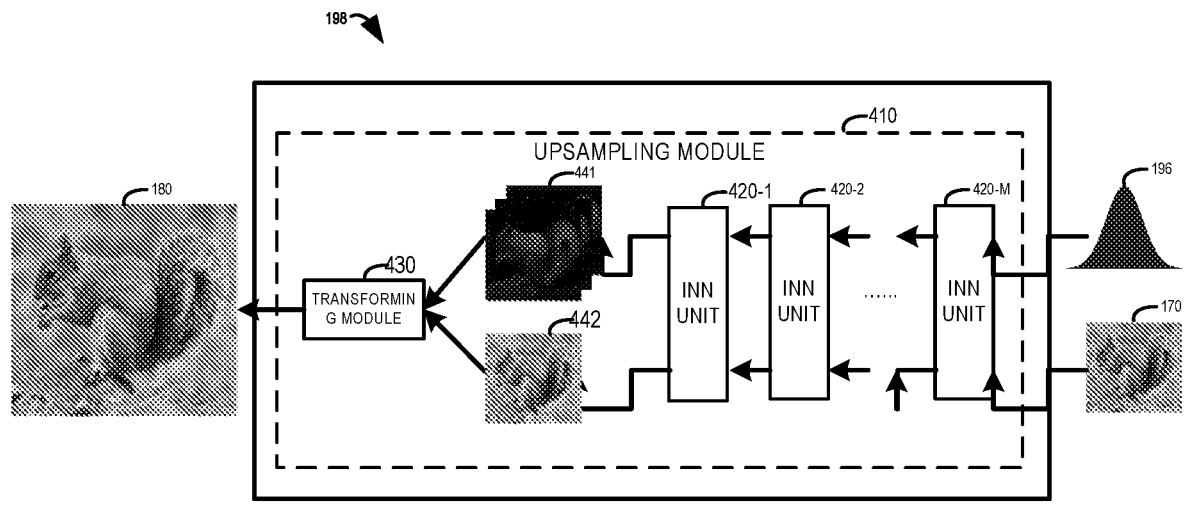
FIG. 4A illustrates a schematic block diagram of an inverse network of the invertible neural network according to implementations of the subject matter described herein.

As shown in FIG. 1B, after the completion of training the invertible neural network 190, the input image 170 and the second high-frequency information 196 conforming to the predetermined distribution may be input to the inverse network 198 of the trained invertible neural network 190, so as to obtain the high-resolution output image 180. FIG. 4A shows a schematic block diagram of the inverse network 198 of the invertible neural network 191 shown in FIG. 2A. As shown in FIG. 4A, the network 198 may be formed by serially connecting one or more upsampling modules 410. For the purpose of brevity, FIG. 4A only shows one upsampling module 410. An image magnification ratio supported by the inverse network 192 may be determined by an image magnification ratio supported by each upsampling module 410 and the number of included upsampling modules 410. For example, suppose each upsampling module 410 supports to upscale an image by 2 times and the inverse network 192 comprises 2 upsampling modules 410, then the inverse network 192 supports to upscale the image by 4 times.

Figure 4B:
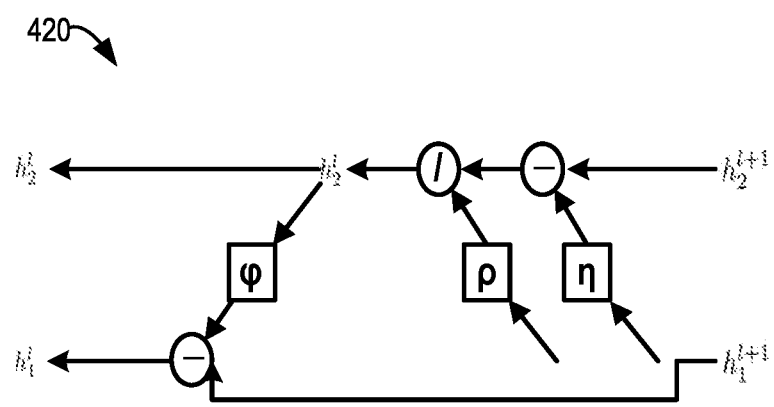
FIG. 4B illustrates a schematic view of an example invertible neural network unit according to implementations of the subject matter described herein.

As shown in FIG. 4A, for example, the upsampling module 410 may comprise a transforming module 430 and one or more INN units 420-1, 420-2 ... 420-M (collectively or separately referred to as "INN unit 420," wherein M≥1). As shown in FIG. 4B, the structure of the INN unit 420 is the inverse of the structure of the INN unit 220 as shown in FIG. 2B. Take the INN unit 420-M for example. Suppose the low-resolution input image 170 input to the INN unit 420-M is denoted as $h_1^{l+1}$ and the high-frequency information 175 conforming to the predetermined distribution is denoted as $h_2^{l+1}$. As shown in FIG. 4B, an inverse transformation of the affine transformation as shown in Formula (3) may be applied to $h_1^{l+1}$, and an inverse transformation of the affine transformation as shown in Formula (4) may be applied to $h_2^{l+1}$. Transformation functions φ, η and ρ shown in FIG. 4B may be arbitrary functions. It should be understood that the INN unit 420 as shown in FIG. 4B is only for the purpose of illustration and not intended to limit the scope of the subject matter described herein. Implementations of the subject matter described herein are also applicable to an INN unit with other different structures. Examples of the INN unit include, without limitation, an invertible convolution block, an invertible residual grid cell, an invertible generative network unit, a deep invertible network unit, etc.

As shown in FIG. 4A, one or more INN units 420 may convert the low-resolution input image 170 and the second high-frequency information conforming to the predetermined distribution into a high-frequency component 441 and a low-frequency component 442 to be merged. On the contrary to the transforming module 240 as shown in FIG. 2A, the transforming module 430 may merge the high-frequency component 441 and the low-frequency component 442 into a high-resolution output image 180. In some implementations, when the transforming module 230 is implemented as 1×1 inverse convolution blocks, the transforming module 430 may be implemented as 1×1 invertible convolution blocks. Alternatively, when the transforming module 230 is implemented as a wavelet transforming module, the transforming module 430 may be implemented as a wavelet inverse transforming module. For example, when the transforming module 230 is implemented as a Haar transforming module, the transforming module 430 may be implemented as a Haar inverse transforming module. Alternatively, the transforming module 430 may also be implemented as any known or to-be-developed transforming modules that can merge a low-frequency component and a high-frequency component into an image.

Embodiments of the subject matter described herein simulate a downsampling process of an input image by using an invertible neural network and generate a high-resolution output image by using an inverse network of the invertible neural network. Based on such an approach, implementations of the subject matter described herein may not reply on pairs of image training data, and can thereby more accurately simulate an actual downsampling process of the input image and generate a high-quality and high-resolution output image.

Figure 5:
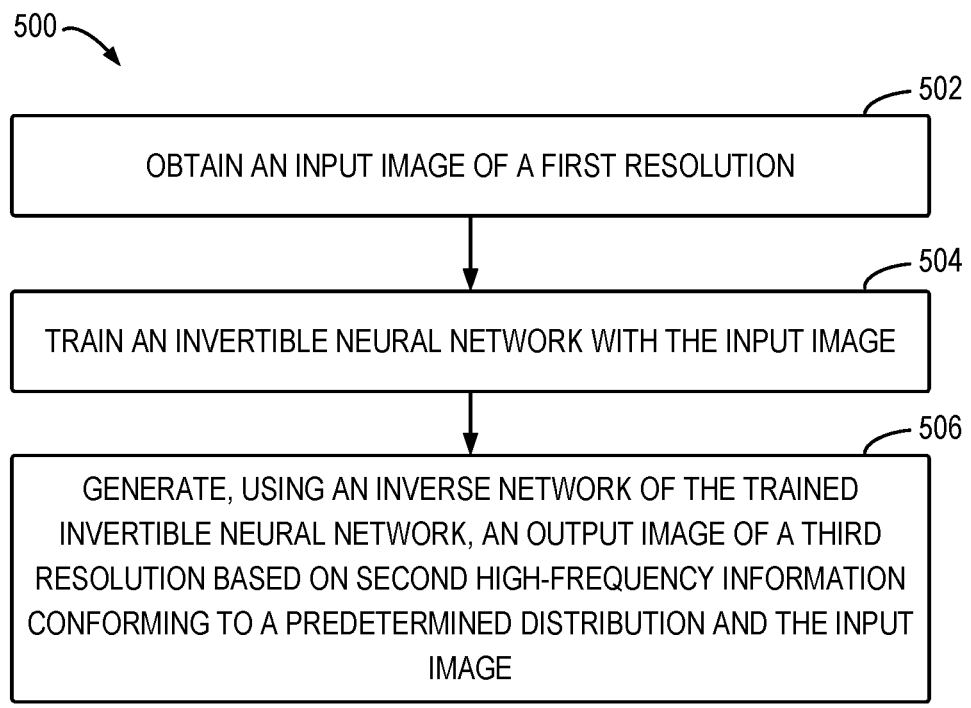
FIG. 5 illustrates a flowchart of an example method for super-resolution image reconstructing according to implementations of the subject matter described herein.

FIG. 5 shows a flowchart of a method 500 for image super-resolution reconstructing according to some implementations of the subject matter described herein. The method 500 may be implemented by the computing device, e.g., may be implemented at the image processing module 122 in the memory 120 of the computing device 100. At 502, the computing device 100 obtains an input image of a first resolution. At 504, the computing device 100 trains an invertible neural network with the input image, the invertible neural network being configured to generate an intermediate image of a second resolution and first high-frequency information based on the input image, the second resolution being lower than the first resolution. At 506, the computing device 100 generates, using an inverse network of the trained invertible neural network, an output image of a third resolution based on second high-frequency information conforming to a predetermined distribution and the input image, the third resolution being greater than the first resolution.

Some example implementations of the subject matter described herein are listed below.

In a first aspect, the subject matter described herein provides a computer-implemented method. The method comprises: obtaining an input image of a first resolution; training an invertible neural network with the input image, the invertible neural network being configured to generate an intermediate image of a second resolution and first high-frequency information based on the input image, the second resolution being lower than the first resolution; and generating, using an inverse network of the trained invertible neural network, an output image of a third resolution based on second high-frequency information conforming to a predetermined distribution and the input image, the third resolution being greater than the first resolution.

In some implementations, training an invertible neural network with the input image comprises: determining a plurality of target functions based on the input image and the intermediate image; determining a total target function for training the invertible neural network by combining at least some of the plurality of target functions; and determining network parameters for the invertible neural network by minimizing the total target function.

In some implementations, determining a plurality of target functions comprises: determining a first target function based on a difference between a pixel distribution in the intermediate image and a pixel distribution in an image block of the input image, the image block being of the second resolution.

In some implementations, determining the first target function comprises: distinguishing, by using a discriminator, whether a pixel of the intermediate image belongs to the intermediate image or the image block; and determining the first target function based on the distinguishing.

In some implementations, determining a plurality of target functions comprises: determining a second target function based on a difference between a distribution of the first high-frequency information and the predetermined distribution.

In some implementations, determining a plurality of target functions comprises: generating, by using an inverse network of the invertible neural network, a reconstructed image of the first resolution based on third high-frequency information conforming to the predetermined distribution and the intermediate image; and determining a third target function based on a difference between the input image and the reconstructed image.

In some implementations, determining the plurality of target functions comprises: obtaining a reference image corresponding to semantics of the input image, the reference image being of the second resolution; and determining a fourth target function based on a difference between the intermediate image and the reference image.

In some implementations, the invertible neural network comprises a transforming module and at least one invertible network unit, and generating the output image comprises: generating, based on the input image and the second high-frequency information and by using the at least one invertible network unit, a low-frequency component and a high-frequency component to be merged, the low-frequency component representing semantics of the input image and the high-frequency component being related to the semantics; and merging, by using the transforming module, the low-frequency component and the high-frequency component into the output image.

In some implementations, the transforming module comprises at least one of: an invertible convolution block; and a wavelet transforming module.

In a second aspect, the subject matter described herein provides a device. The device comprises: a processing unit; and a memory, coupled to the processing unit and including instructions stored thereon, the instructions, when executed by the processing unit, causing the device to perform acts, including: obtaining an input image of a first resolution; training an invertible neural network with the input image, the invertible neural network being configured to generate an intermediate image of a second resolution and first high-frequency information based on the input image, the second resolution being lower than the first resolution; and generating, using an inverse network of the trained invertible neural network, an output image of a third resolution based on second high-frequency information conforming to a predetermined distribution and the input image, the third resolution being greater than the first resolution.

In some implementations, training an invertible neural network with the input image comprises: determining a plurality of target functions based on the input image and the intermediate image; determining a total target function for training the invertible neural network by combining at least some of the plurality of target functions; and determining network parameters for the invertible neural network by minimizing the total target function.

In some implementations, determining a plurality of target functions comprises: determining a first target function based on a difference between a pixel distribution in the intermediate image and a pixel distribution in an image block of the input image, the image block being of the second resolution.

In some implementations, determining the first target function comprises: distinguishing, by using a discriminator, whether a pixel of the intermediate image belongs to the intermediate image or the image block; and determining the first target function based on the distinguishing.

In some implementations, determining a plurality of target functions comprises: determining a second target function based on a difference between a distribution of the first high-frequency information and the predetermined distribution.

In some implementations, determining a plurality of target functions comprises: generating, by using an inverse network of the invertible neural network, a reconstructed image of the first resolution based on third high-frequency information conforming to the predetermined distribution and the intermediate image; and determining a third target function based on a difference between the input image and the reconstructed image.

In some implementations, determining the plurality of target functions comprises: obtaining a reference image corresponding to semantics of the input image, the reference image being of the second resolution; and determining a fourth target function based on a difference between the intermediate image and the reference image.

In some implementations, the invertible neural network comprises a transforming module and at least one invertible network unit, and generating the output image comprises: generating, based on the input image and the second high-frequency information and by using the at least one invertible network unit, a low-frequency component and a high-frequency component to be merged, the low-frequency component representing semantics of the input image and the high-frequency component being related to the semantics; and merging, by using the transforming module, the low-frequency component and the high-frequency component into the output image.

In some implementations, the transforming module comprises at least one of: an invertible convolution block; and a wavelet transforming module.

In a third aspect, a computer program product is provided. The computer program product is tangibly stored in a non-transitory computer storage medium and comprises machine-executable instructions which, when executed by a device, cause the device to perform acts, including: obtaining an input image of a first resolution; training an invertible neural network with the input image, the invertible neural network being configured to generate an intermediate image of a second resolution and first high-frequency information based on the input image, the second resolution being lower than the first resolution; and generating, using an inverse network of the trained invertible neural network, an output image of a third resolution based on second high-frequency information conforming to a predetermined distribution and the input image, the third resolution being greater than the first resolution.

In some implementations, training an invertible neural network with the input image comprises: determining a plurality of target functions based on the input image and the intermediate image; determining a total target function for training the invertible neural network by combining at least some of the plurality of target functions; and determining network parameters for the invertible neural network by minimizing the total target function.

In some implementations, determining a plurality of target functions comprises: determining a first target function based on a difference between a pixel distribution in the intermediate image and a pixel distribution in an image block of the input image, the image block being of the second resolution.

In some implementations, determining the first target function comprises: distinguishing, by using a discriminator, whether a pixel of the intermediate image belongs to the intermediate image or the image block; and determining the first target function based on the distinguishing.

In some implementations, determining a plurality of target functions comprises: determining a second target function based on a difference between a distribution of the first high-frequency information and the predetermined distribution.

In some implementations, determining a plurality of target functions comprises: generating, by using an inverse network of the invertible neural network, a reconstructed image of the first resolution based on third high-frequency information conforming to the predetermined distribution and the intermediate image; and determining a third target function based on a difference between the input image and the reconstructed image.

In some implementations, determining the plurality of target functions comprises: obtaining a reference image corresponding to semantics of the input image, the reference image being of the second resolution; and determining a fourth target function based on a difference between the intermediate image and the reference image.

In some implementations, the invertible neural network comprises a transforming module and at least one invertible network unit, and generating the output image comprises: generating, based on the input image and the second high-frequency information and by using the at least one invertible network unit, a low-frequency component and a high-frequency component to be merged, the low-frequency component representing semantics of the input image and the high-frequency component being related to the semantics; and merging, by using the transforming module, the low-frequency component and the high-frequency component into the output image.

In some implementations, the transforming module comprises at least one of: an invertible convolution block; and a wavelet transforming module.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, a special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or a server.

In the context of this subject matter described herein, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be understood that the operations are required to be executed in the particular order shown or in a sequential order, or all operations shown are required to be executed to achieve the expected results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
obtaining an input image of a first resolution;
training an invertible neural network with the input image, the invertible neural network being configured to generate an intermediate image of a second resolution and first high-frequency information based on the input image, the second resolution being lower than the first resolution;
wherein training an invertible neural network with the input image comprises:
determining a plurality of target functions based on the input image and the intermediate image by determining a first target function based on a difference between a pixel distribution in the intermediate image and a pixel distribution in an image block of the input image, the image block being of the second resolution; and
generating, using an inverse network of the trained invertible neural network, an output image of a third resolution based on second high-frequency information conforming to a predetermined distribution and the input image, the third resolution being greater than the first resolution.

2. The method of claim 1, wherein training an invertible neural network with the input image further comprises:
determining a total target function for training the invertible neural network by combining at least some of the plurality of target functions; and
determining network parameters for the invertible neural network by minimizing the total target function.

3. The method of claim 2, wherein determining the first target function comprises:
distinguishing, by using a discriminator, whether a pixel of the intermediate image belongs to the intermediate image or the image block; and
determining the first target function based on the distinguishing.

4. The method of claim 2, wherein determining a plurality of target functions comprises:
determining a second target function based on a difference between a distribution of the first high-frequency information and the predetermined distribution.

5. The method of claim 2, wherein determining a plurality of target functions comprises:
generating, by using an inverse network of the invertible neural network, a reconstructed image of the first resolution based on third high-frequency information conforming to the predetermined distribution and the intermediate image; and
determining a third target function based on a difference between the input image and the reconstructed image.

6. The method of claim 2, wherein determining the plurality of target functions comprises:
obtaining a reference image corresponding to semantics of the input image, the reference image being of the second resolution; and
determining a fourth target function based on a difference between the intermediate image and the reference image.

7. The method of claim 1, wherein the invertible neural network comprises a transforming module and at least one invertible network unit, and wherein generating the output image comprises:
generating, based on the input image and the second high-frequency information and by using the at least one invertible network unit, a low-frequency component and a high-frequency component to be merged, the low-frequency component representing semantics of the input image and the high-frequency component being related to the semantics; and
merging, by using the transforming module, the low-frequency component and the high-frequency component into the output image.

8. The method of claim 7, wherein the transforming module comprises at least one of:
an invertible convolution block; and
a wavelet transforming module.

9. A device, comprising:
a processing unit; and
a memory coupled to the processing unit and comprising instructions stored thereon which, when executed by the processing unit, cause the device to perform acts comprising:
obtaining an input image of a first resolution;
training an invertible neural network with the input image, the invertible neural network being configured to generate an intermediate image of a second resolution and first high-frequency information based on the input image, the second resolution being lower than the first resolution;

wherein training an invertible neural network with the input image comprises:

determining a plurality of target functions based on the input image and the intermediate image by determining a first target function based on a difference between a pixel distribution in the intermediate image and a pixel distribution in an image block of the input image, the image block being of the second resolution; and generating, using an inverse network of the trained invertible neural network, an output image of a third resolution based on second high-frequency information conforming to a predetermined distribution and the input image, the third resolution being greater than the first resolution.

10. The device of claim 9, wherein training an invertible neural network with the input image further comprises:

determining a total target function for training the invertible neural network by combining at least some of the plurality of target functions; and determining network parameters for the invertible neural network by minimizing the total target function.

11. The device of claim 10, wherein determining the first target function comprises:

distinguishing, by using a discriminator, whether a pixel of the intermediate image belongs to the intermediate image or the image block; and determining the first target function based on the distinguishing.

12. The device of claim 10, wherein determining a plurality of target functions comprises:

determining a second target function based on a difference between a distribution of the first high-frequency information and the predetermined distribution.

13. A computer program product being tangibly stored in a non-transitory computer readable storage medium and comprising machine-executable instructions which, when executed by a device, cause the device to perform acts comprising:

obtaining an input image of a first resolution;

training an invertible neural network with the input image, the invertible neural network being configured to generate an intermediate image of a second resolution and first high-frequency information based on the input image, the second resolution being lower than the first resolution;

wherein training an invertible neural network with the input image comprises:

determining a plurality of target functions based on the input image and the intermediate image by determining a first target function based on a difference between a pixel distribution in the intermediate image and a pixel distribution in an image block of the input image, the image block being of the second resolution; and generating, using an inverse network of the trained invertible neural network, an output image of a third resolution based on second high-frequency information conforming to a predetermined distribution and the input image, the third resolution being greater than the first resolution.

14. The computer program product of claim 13, wherein training an invertible neural network with the input image further comprises:

determining a total target function for training the invertible neural network by combining at least some of the plurality of target functions; and determining network parameters for the invertible neural network by minimizing the total target function.

15. The computer program product of claim 14, wherein determining the first target function comprises:

distinguishing, by using a discriminator, whether a pixel of the intermediate image belongs to the intermediate image or the image block; and determining the first target function based on the distinguishing.

16. The computer program product of claim 14, wherein determining a plurality of target functions comprises:

determining a second target function based on a difference between a distribution of the first high-frequency information and the predetermined distribution.

* * * * *